US007190767B2

(12) United States Patent
Kracker et al.

(10) Patent No.: US 7,190,767 B2
(45) Date of Patent: *Mar. 13, 2007

(54) TELECOMMUNICATIONS LINE TEST EXTENSION APPARATUS

(75) Inventors: Denis Joseph Kracker, Houston, TX (US); Michael Wayne Snider, Houston, TX (US)

(73) Assignee: SBC Technology Resources, Inc., Austin, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 10/949,857

(22) Filed: Sep. 24, 2004

(65) Prior Publication Data

US 2005/0036587 A1    Feb. 17, 2005

Related U.S. Application Data

(63) Continuation of application No. 10/151,482, filed on May 17, 2002, now Pat. No. 6,813,339.

(51) Int. Cl.
*H04M 1/24*    (2006.01)
*H04M 3/08*    (2006.01)
*H04M 3/22*    (2006.01)

(52) U.S. Cl. ............... 379/25; 379/22.06; 379/22.07; 379/27.07; 324/555

(58) Field of Classification Search ............... 379/1.01, 379/4, 21, 22.03, 22.06, 22.07, 25, 26.01, 379/27.01, 27.07, 28, 29.01, 29.05, 22.04; 324/512, 539, 540, 555, 66, 67

See application file for complete search history.

(56) References Cited

U.S. PATENT DOCUMENTS 6,516,053 B1 * 2/2003 Ryan et al. ................. 379/21
6,813,339 B2 * 11/2004 Kracker et al. ............. 379/25

* cited by examiner

*Primary Examiner*—Quoc Tran
(74) *Attorney, Agent, or Firm*—Cardinal Law Group

(57) ABSTRACT

A method, apparatus and system is provided for testing a communications line. The method comprises removing a repeater from an access case connected to a telecommunications line, connecting a test adapter to the access case and a test extension apparatus to the test adapter. The method further comprises connecting a plurality of diagnostic equipment devices to the test extension apparatus and testing the communications line with the diagnostics equipment via the test extension apparatus. The apparatus comprises a spool having a plurality of terminals, and a length of wire wound on the spool. The wire includes a plurality of subpairs of wires each of the subpairs of wires having a first end electrically connectable to the communications line, and a second end electrically connected to a corresponding terminal on the spool.

19 Claims, 1 Drawing Sheet

TELECOMMUNICATIONS LINE TEST EXTENSION APPARATUS

RELATED APPLICATIONS

This application is a continuation of and claims priority to U.S. patent application Ser. No. 10/151,482, filed May 17, 2002 now U.S. Pat. No. 6,813,339, titled "Telecommunications Line Test Extension Apparatus" by Denis J. Kracker and Michael W. Snider, the entirety of which is incorporated herein.

TECHNICAL FIELD OF THE INVENTION

This invention relates to equipment for testing telecommunications lines.

BACKGROUND OF THE INVENTION

Long spans of copper wires used for T1, Integrated Services Digital Network (ISDN) and other telecommunications purposes often include repeaters designed to boost the signal traveling through the wires. When a problem is reported in the line, a technician often must descend into a manhole in order to access an apparatus case that houses a repeater. Such access may involve inserting a test adapter into a slot in the apparatus case. A conventional test adapter includes a series of receptors for a bantam plug mounted on one end of a ten foot long cord. The opposite end of the cord normally has a pair of alligator clips for connection to a variety of devices used to diagnose the problem in the line.

One problem that arises from this arrangement is that the technician often uses multiple diagnostic devices, and the technician must ascend from the manhole to retrieve each successive device from the service vehicle. Another problem with the conventional approach is that the diagnostic devices themselves are exposed to a particularly harsh environment in the manhole. Still another problem that confronts the technicians is that cellular telephone reception in manholes is often poor or nonexistent, hampering their ability to communicate with a central office.

BRIEF DESCRIPTION OF THE DRAWINGS

The objects, features and advantages of the present invention are readily apparent from the following detailed description of the best mode for carrying out the invention when taken in conjunction with the accompanying drawings, in which.

DETAILED DESCRIPTION OF THE PRESENTLY PREFERRED EMBODIMENT(S)

Figure 1:
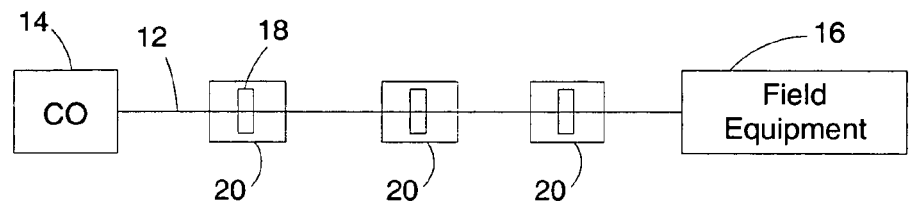
FIG. 1 is a schematic representation of a telecommunications network including a series of access cases.

FIG. 1 schematically depicts a telecommunications network 10 including relatively long spans 12 of copper wires that extend from a central office 14 toward a field side 16. The spans 12 may comprise segments of T1, ISDN or other telecommunications lines that include repeaters 18 for amplifying voice or data signals traveling through the lines. The repeaters 18 are mounted in slots in access cases 20.

The spans 12 are often buried underground such that the only physical access to the lines is through manholes. The repeaters 18 are normally situated in the manholes. In order to locate the source of a problem in the line, a repeater must be removed from its slot in the access case 20 and replaced with an adapter. Various test devices can then be connected to the line in order to send electrical signals either toward test centers in communication with the central office 14, or toward telephones or other telecommunications equipment on the field side 16.

Figure 2:
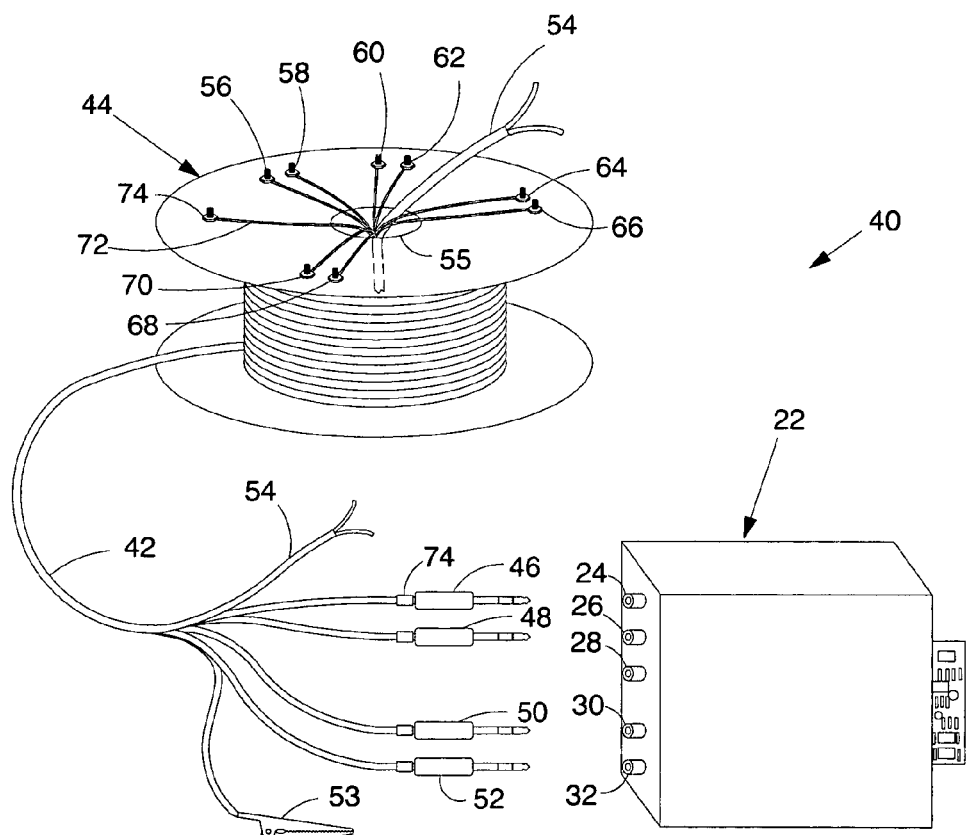
FIG. 2 is a perspective view of one embodiment of a test extension apparatus for use in diagnosing problems with the telecommunications network.

FIG. 2 shows a typical test adapter 22, which includes bantam plug receptors 24, 26, 28, 30 and 32. The receptors 24 and 26 represent the transmit and receive sides, respectively, of a circuit toward the central office 14. The receptors 30 and 32 represent the transmit and receive sides, respectively, of a circuit toward the field side 16 of the line. The receptor 28 is normally grounded.

A test extension apparatus 40 includes an extended length of six-pair JK house wire 42 wound on a spool 44. At the free end of the wire 42, four of the six pairs are electrically connected to bantam plugs 46, 48, 50 and 52. A fifth pair of the wire 42 is electrically connected to an alligator clip 53 normally used for ground. The sixth pair 54 of the wire 42 is stripped for use with a communications headset, as described below.

The wire 42 is wound on the spool 44, and the end of the wire 42 opposite the bantam plugs is fed up through a center 55 of the spool. One pair of the wire 42 is electrically connected to positive and negative terminals 56 and 58, respectively. A second pair of the wire 42 is electrically connected to positive and negative terminals 60 and 62, respectively. Third and fourth pairs of the wire 42 are similarly connected to terminals 64, 66, 68 and 70. A ground wire 72 is electrically connected to a terminal 74. The terminals are simply formed, in a preferred embodiment, by three-quarter inch bolts inserted through one side of the spool 44 proximate its periphery and retained by washers and nuts.

The wire pairs are provided with a conventional color-coding scheme. Thus, the wire leading to the positive terminal 56 may be blue, while the wires leading to the positive terminals 60, 64 and 68 may be respectively orange, green and brown. The wires leading to the negative terminals 58, 62, 66 and 70 are generally all white. In the absence of color-coding, the terminals on the spool 44 may be provided with some identifying indicia such as colors or alphanumeric characters.

The bantam plugs 46, 48, 50 and 52 are respectively insertable into the receptor 24, 26, 30 and 32 on the adapter 22. The bantam plugs are also preferably provided with identifying indicia to indicate their correspondence with the terminals on the spool 44. In one embodiment, locations near the bantam plugs 46, 48, 50 and 52 are respectively provided with blue, orange, green and brown tie wraps or tape 74.

A technician making a service call can leave the spool 44 in or near his service vehicle, and descend once into the manhole to insert the adapter 22 into the access case 20. The technician can then connect any diagnostic equipment, such as a time domain reflectometer (TDR), to the proper send/receive and central office/field side terminals on the spool 44. Successive pieces of diagnostic equipment, if required, are easily and quickly connectable to the terminals on the spool 44 in place of the preceding piece of equipment without having to descend into the manhole.

The technician in the service vehicle can simultaneously communicate with a partner in the manhole through the sixth pair 54 of the wire 42. In a preferred embodiment, both parties electrically connect headsets to their respective ends of the communication wires 54, and one of the parties connects a nine-volt battery to the circuit to provide power. At the same time, the technician in the service vehicle has unimpeded access to communications with the central office 14, either through on-board radios or through conventional cellular communications.

Systems incorporating the teachings of the present invention thus reduce the number of trips down into the manhole that previous systems required. Moreover, the diagnostic devices themselves are not exposed to the sometimes damaging environment in the manhole. Finally, communications between technicians at the repair site is improved, as are communications between the repair site and the central office.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method of testing a communications line, the method comprising:
    removing a repeater from an access case, the access case connected to a telecommunications line;
    connecting a test adapter to the access case, the test adapter having a test extension apparatus connected thereto wherein the test extension apparatus includes a spool having a plurality of terminals, a wire wound around the spool, the wire comprising a plurality of wire subpairs, and wherein a first end of each of the plurality of wire subpairs is connected to at least one of the plurality of terminals and a second end is operably connected to the test adapter;
    connecting a plurality of diagnostic equipment devices to the test extension apparatus; and
    testing the communications line with the diagnostics equipment via the test extension apparatus.

2. The method of claim 1 further comprising:
    communicating results of the testing from the adapter to a remote location.

3. The method of claim 1 further comprising: providing identifying indicia to the test extension apparatus and test adapter.

4. The method of claim 1 wherein the second end of one of the plurality of wire subpairs comprises a bantum plug for operable connection to the test adapter.

5. An apparatus for testing a communications line, the apparatus comprising:
    a spool having a plurality of terminals;
    a length of wire wound on the spool, the wire having a plurality of subpairs of wires; and
    each of the subpairs of wires having opposite ends, a first end of each of the subpairs of wires being electrically connectable to the communications line, and a second end of each of the subpairs of wires being electrically connected to a corresponding terminal on the spool.

6. The apparatus of claim 5 wherein one of the plurality of subpair of wires comprises a first end connectable to an electrical ground, and a second end electrically connectable to one of the plurality of terminals on the spool.

7. The apparatus of claim 5 wherein one of the plurality of subpair of wires is adapted for communications between locations proximate the first end of each of the subpairs of wires and the second end of each of the subpairs of wires.

8. A system for testing a communications line, the system comprising:
    an access case operably connected to a telecommunications line;
    a test adapter operably connected to the access case, the test adapter having a plurality of receptors; and
    a test extension apparatus, wherein the test extension apparatus comprises:
    a spool having a plurality of terminals;
    a length of wire wound on the spool, the wire having a plurality of subpairs of wires; and
    each of the subpairs of wires having opposite ends, a first end of each of the subpairs of wires being electrically connectable to the test adapter, and a second end of each of the subpairs of wires being electrically connected to a corresponding terminal on the spool.

9. The system of claim 8 wherein one of the plurality of subpair of wires comprises a first end connectable to an electrical ground, and a second end electrically connectable to one of the plurality of terminals on the spool.

10. The system of claim 8 wherein one of the plurality of subpair of wires is adapted for communications between locations proximate the first end of each of the subpairs of wires and the second end of each of the subpairs of wires.

11. The system of claim 10 wherein each of the first end and the second end of the subpair of wire adapted for communications is operably connected to a headset.

12. The method of claim 1 further comprising:
    leaving the spool near a service vehicle; and
    descending into a manhole.

13. The method of claim 1 further comprising:
    communicating via at least one of the wire subpairs.

14. The method of claim 1 further comprising:
    attaching at least one of the subpairs to ground.

15. The apparatus of claim 5 wherein the second end of one of the plurality of wire subpairs comprises a bantum plug for operable connection to the test adapter.

16. The apparatus of claim 5 further comprising means for communicating between a first service person at a first end of the wires and a second service person at a second end of the wires.

17. The apparatus of claim 5 wherein the test adapter comprises a bantam plug receptor for operable connection with the second end of one of the plurality of wire subpairs.

18. The system of claim 8 wherein the test adapter comprises a bantam plug receptor for operable connection with the second end of one of the plurality of wire subpairs.

19. The system of claim 8 wherein the second end of one of the plurality of wire subpairs comprises a bantum plug for operable connection to the test adapter.

* * * * *